Nov. 23, 1965     M. WALLSHEIN     3,218,714
ORTHODONTIC BRACKETS
Filed Oct. 13, 1961
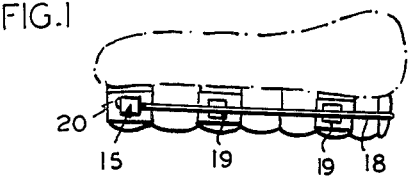
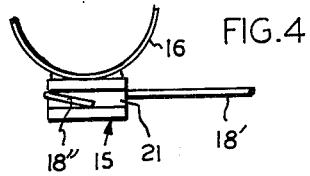
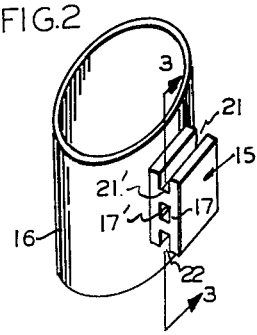
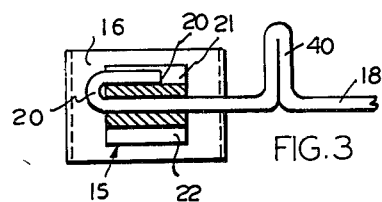
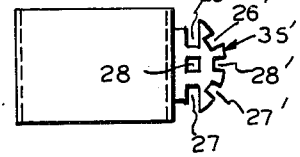
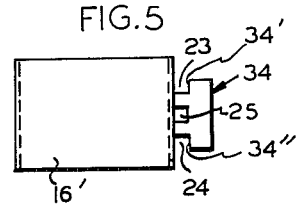
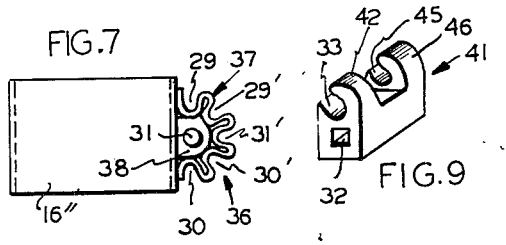
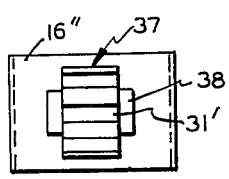
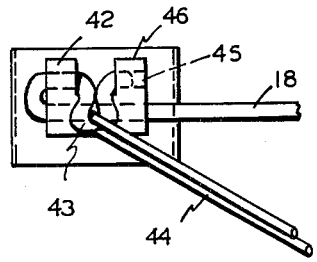
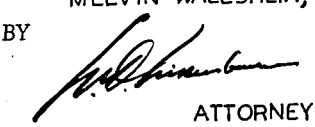
INVENTOR,
MELVIN WALLSHEIN,
BY
ATTORNEY United States Patent Office 3,218,714
Patented Nov. 23, 1965

1

3,218,714
ORTHODONTIC BRACKETS
Melvin Wallshein, 8645 Bay Parkway, Brooklyn, N.Y.
Filed Oct. 13, 1961, Ser. No. 144,888
1 Claim. (Cl. 32—14)

The present invention relates to brackets for supporting an arch wire in orthodontic procedures and more particularly to a type which is adaptable for anchoring the ends of the arch wire and if desired, may be used wherever a bracket is required.

An object of this invention is to provide a novel and improved orthodontic bracket to anchor the end of an arch wire which is around teeth in a mouth. To accomplish such function, the bracket requires, in its simplest employment, that the end of the arch wire be bent into hook form whereby its secure engagement with the bracket is easily effected. In various embodiments of this invention, provision is made to avoid stressing the arch wire in torsion and in others, the installation can be in a manner to produce torque action.

Another object thereof is to provide an orthodontic bracket of the nature set forth, which shields the arch wire end to avoid its hurting the patient.

A further object thereof is to provide a novel and improved orthodontic bracket of the character mentioned, whereby the arch wire end is fixed against axial rotation so that any crimps in the arch wire will remain in their predetermined direction which will not be changed by any manipulation in effecting the anchorage of the arch wire.

Another object thereof is to provide a bracket for anchoring the end of the arch wire, of the kind described, which allows the arch wire end to be formed with a hook for attachment thereto of an elastic element for effecting, for instance, an inter-maxillary connection or other connections for appurtenances well known in orthodontia, and further, to shield the very end of said arch wire.

Still a further object of this invention is to provide novel and improved bracket constructions of the character described and having the attributes mentioned, which are simple structures, easy to use, reasonable in cost and efficient in carrying out the purposes for which they are designed.

Other objects and advantages will become apparent as this disclosure proceeds.

For one practice of this invention, the bracket may be a horizontally lengthwise piece secured onto the outer surface of a thin upright tubular band of metal which is adapted to be tightly fitted about the tooth where the end of the arch wire is to be anchored. Such bracket shall in a preferred embodiment include two open-ended passages horizontally therethrough. Out of the first passage, the arch wire can move only longitudinally, not laterally, regardless of how the arch wire can be entered therein and it is preferred that such passage be a rectangular or square hole. The other passage may be an open channel to receive the very end part of the arch wire which shall be in hook form. It is preferred, though not mandatory, that said passages be tangent to a pair of spaced vertical planes. The bracket may have additional passages along those mentioned. The form of the bracket may be such that it has only the first passage therethrough and when secured to the band, one or more additional channels having a pair of opposite walls each come into being. In another form, the bracket may have two ears with a passage through each, so the end of the hook at the end of the arch wire extending between such ears may be bent into a hook for attachment to an elastic element to effect, for instance, an inter-maxillary connection and also afford a guard for the extreme end of such auxiliary hook. Further, the second and additional passages may be provided in any manner, even by a separate element secured to the band in a position to straddle the bracket.

In the accompanying drawing forming part of this specification, similar characters of reference indicate corresponding parts in all the views.

FIG. 1 is a side view of a patient's upper teeth in his mouth, equipped with an arch wire which is anchored in brackets embodying the teachings of this invention.

FIG. 2 is an enlarged perspective view of a preferred embodiment of such bracket carried on a band which is adapted to be tightly mounted on a tooth.

FIG. 3 is a section taken at line 3—3 in FIG. 2 showing an arch wire anchored in said bracket; said wire having a crimp therein whose direction has not been altered nor will it be altered. In fact, the bracket so engages the arch wire that the direction of the crimp is maintained as intended.

FIG. 4 is a top view of FIG. 2, showing a manner of anchoring an arch wire to the bracket, when the wire's cross-section is smaller than the maximum arch wire size the bracket is adapted for.

FIG. 5 is a side view of a bracket of modified form mounted on a band.

FIG. 6 is a similar view of a further modified form of bracket mounted on a band.

FIG. 7 is a similar view showing another construction for the bracket of the type shown in FIG. 6.

FIG. 8 is a front view of the article shown in FIG. 7.

FIG. 9 is still another form of a bracket structure, shown in perspective.

FIG. 10 is a front view of the bracket of FIG. 9, shown mounted on a band and having an arch wire anchored thereto. The end of such arch wire is formed into a hook holding an elastic element and is shielded.

In the drawing, in which it is to be noted that all the FIGS. 1–10 are drawn to an enlarged scale, the numeral 15 designates generally one form of bracket which is secured to the outer surface of an upright thin band 16; said band being adapted to be tightly mounted onto a tooth in the mouth. This bracket has a horizontal passage 17 therethrough in line with the arch wire 18 which is supported on brackets 19. The bracket 15 is for anchoring an end of said arch wire. Such is done by having the arch wire's end formed into a hook 20 whose distal free end 20' sets into a channel on the bracket and of course, the arch wire is through the passage 17. The bracket may have one channel 21, an additional channel 22 and as hereinafter set forth, more channels as shown in the embodiments illustrated in FIGS. 6 and 7. Of importance, the arch wire should be unable to freely leave the passage 17 by a lateral movement, that is, said arch wire shall be able to leave only by a lengthwise movement. Hence, it is simplest that said passage 17 shall be a hole through the bracket body. Any bracket which locks the arch wire against lateral exit may be used.

The bracket is most practical when the hole 17 is square, for it can be used for arch wires of any cross-section up to maximum dimensions of such holes. It is also preferred that the planes of the two opposite walls which confine such square hole shall also confine the channels 21 and 22. Such condition is also preferred to prevail for the channels 23, 24 respectively with the passage 25, the channels 26, 27 respectively with the passage 28 and the channels 29, 30 respectively with the passage 31.

The bracket structures illustrated may be made of extruded stock. The bracket 15 shown in FIG. 2, may be an H-bar having a lengthwise hole 17 through its horizontal element. If it includes only one of its channels 21 or 22, as such would suffice, it would be an A-bar. In FIG. 5 the bracket member 34 would per se be a pi-bar and if minus one of its portions 34' or 34" whose presence make either the channel 23 or 24 in conjunction with the band 16', it would then be an F-bar. In the FIGS. 6 and 7, the brackets indicated generally by the numerals 35', 36 respectively, may each be deemed part of a gear form which includes a number of teeth, preferably successive ones. In FIG. 6, the spacing of the teeth offer the angularly spaced channels 26, 26', 28', 27' and 27. In FIG. 7, the channels are denoted by the numerals 29, 29', 31', 30' and 30. The gear formation 37 may be integral with the tubular member 38 or it may be made separate of strip metal in straight lengths to be cut into suitable sections to be bent to straddle 38 and be secured at its ends to the band 16".

In use, the arch wire end is set through the passage 17 to extend therefrom sufficiently to have material to form the hook 20. Then with a plier, such end is bent into hook form that its end portion 20' shall just slidingly fit into the channel 21. In such instance, there will be no torque in the arch wire. It is evident that if the wire end is bent and then its hook end need be laterally pushed in order to be entered into the channel 21, that the arch wire will be torqued thereby. However, to have a torqued arch wire, it must be able to turn in the passage 17. I prefer to have a square hole for the passage 17, so as to have the advantage being able to bend the wire, especially when of rectangular cross section, against the straight edge 17' to facilitate a "square" bend. The square bend is essential in all instances where there is a crimp 40 which is to be maintained in its placed position. The edge 17' also aids the making of true square bends in round arch wires to make the hooked end.

The bracket 35' which is multi-channeled, affords torque action which is adjustable. For instance, if the hook is formed to slidably enter the channel 26, it would be stressed in torsion if shifted to lie in any of the other channels and such torque action would be increased, depending upon the arcuate distance between the channel 26 and that into which the hook end is finally set in, as 26', 28', 27'.

For best anchorage condition, the hook end should just fit the channel it is set in, to avoid lateral movement. Firm anchorage may also be provided when the arch wire is relatively of small cross-section as 18' in FIG. 4, where as shown, the hook and 18" is laterally bent and sprung into the channel 21.

In the bracket 41 shown in FIGS. 9 and 10, the arch wire would lie through the passage 32 and its hook end set through the notch 33 of the ear 42 and its end portion may then be bent into the auxiliary hook as shown at 43 to receive an elastic element 44 for effecting various connections well known in orthodontia. The very tip end of the hook 43 may then be shielded by being placed within the notch 45 in the second ear 46 of the bracket, as shown in FIG. 10. This form of bracket may also be made of extruded stock in which the notch 47 and then the notches 33 and 45, may be milled.

In all instances, the bracket body has a passage to hold the arch wire against lateral exit and another passage which is a channel to receive the bent-over end of the hook 20 whereby the arch wire is anchored, and its distal end shielded if positioned within such channel. Each of the channels 21 and 22 of the bracket 15, has a pair of parallel opposite walls. In the bracket body as 34, each of the channels 23, 24 is of V-shaped cross-section. However, upon being mounted onto the band 16', such V-channels become channels of substantially rectangular cross section, for the band wall then serves also as a channel wall as is the instance of the channels 23 and 24.

This invention is capable of numerous forms and various applications without departing from the essential features herein disclosed. It is therefore intended and desired that the embodiments herein shall be deemed merely illustrative and not restrictive and that the patent shall cover all patentable novelty herein set forth; reference being had to the following claim rather than to the specific description herein to indicate the scope of this invention.

I claim:

In an orthodontic system comprising a plurality of tooth bands, bracket means on said tooth bands, an arch wire, the improvement being in that said bracket means has a hole therein normal to the axis of the tooth band, said bracket means further having notch means comprising at least three channels arcuately arranged around said hole and being parallel thereto, said arch wire being hooked back on itself at each end and terminating in end portions parallel to the main portion thereof, the main portion being through said hole and the end portion lying in one of said channels.

References Cited by the Examiner

UNITED STATES PATENTS

| | | | |
|---|---|---|---|
| 1,217,374 | 2/1917 | Walker | 32—14 |
| 1,369,665 | 2/1921 | Johnson | 32—14 |
| 1,398,761 | 11/1921 | Angle et al. | 32—14 |
| 1,553,797 | 2/1925 | Angle | 32—14 |
| 1,584,501 | 5/1926 | Angle | 32—14 |
| 1,821,171 | 9/1931 | Atkinson | 32—14 |
| 1,949,444 | 3/1934 | Angle | 32—14 |
| 1,976,141 | 10/1934 | Richardson | 32—14 |
| 2,196,515 | 4/1940 | Atkinson | 32—14 |
| 2,230,315 | 2/1941 | Winslow | 32—14 |

FOREIGN PATENTS

| | | |
|---|---|---|
| 115,956 | 9/1942 | Australia. |
| 667,040 | 11/1934 | Germany. |

RICHARD A. GAUDET, *Primary Examiner.*

ROBERT E. MORGAN, *Examiner.*